Patented Jan. 5, 1926.

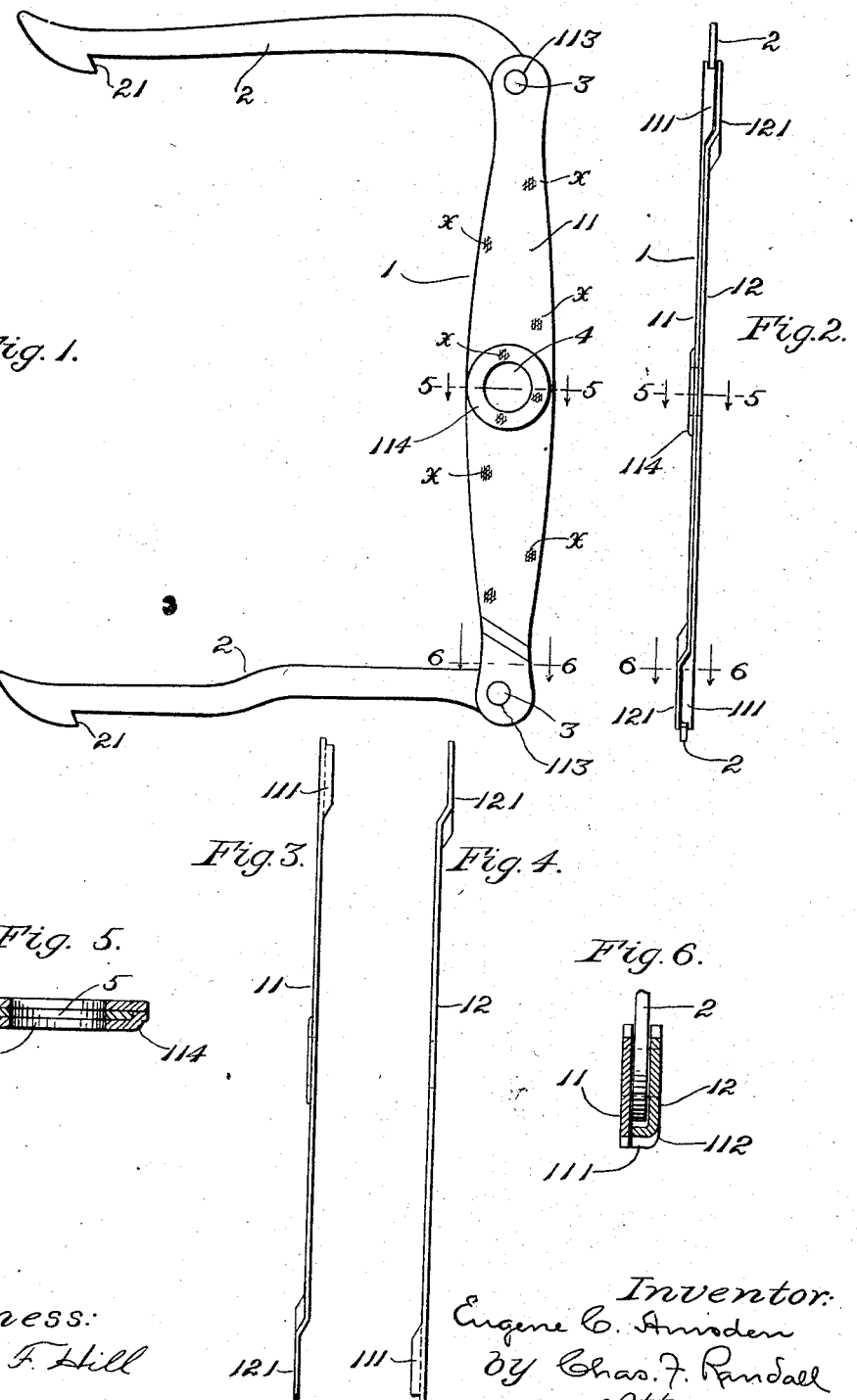

1,568,943

UNITED STATES PATENT OFFICE.

EUGENE C. AMSDEN, OF ALLSTON, BOSTON, MASSACHUSETTS, ASSIGNOR TO THE STAFFORD COMPANY, OF BOSTON, MASSACHUSETTS, A CORPORATION OF MASSACHUSETTS.

DOBBY FOR LOOMS.

Application filed April 5, 1922. Serial No. 549,785.

*To all whom it may concern:*

Be it known that I, EUGENE C. AMSDEN, a citizen of the United States, residing at Allston, Boston, in the county of Suffolk, State of Massachusetts, have invented a certain new and useful Improvement in Dobbies for Looms, of which the following is a specification, reference being had therein to the accompanying drawings.

The invention has relation to loom shedding mechanisms of the type known as dobbies, and more particularly to the hooks and jack-levers or back-levers which are combined with the harness-levers pertaining to such mechanisms.

Objects of the invention are to reduce the cost of the hooks and levers aforesaid, secure greater uniformity and accuracy of shape, and produce hooks and levers having a better finish and appearance than in the case of those heretofore in use.

Dobby hooks and jack-levers or back-levers heretofore in actual use, so far as known to me, have been composed of malleable iron, produced by a procedure involving first casting and subsequently annealing the parts. This entails considerable cost and renders the necessary selling price comparatively high. As produced, the parts vary more or less from the required shape, and they lack uniformity of shape, necessitating more or less manipulation and reshaping in fitting and assembling them for use. Moreover, they are rough and present a more or less unfinished appearance.

The invention consists in the hook produced as hereinafter explained as a stamping of cold rolled steel, with a hole through its butt, and having a pivot-pin fitting said hole with a tight driving fit and thereby securely affixed to the hook. Also, in a jack-lever or back-lever composed of two members of stamped or punched sheet metal, preferably cold rolled steel, secured together face to face by welding, and having the special features to which reference is made hereinafter. Such hooks and levers are much less expensive, can be produced much more expeditiously, can be made more uniform in shape, require less work in fitting them for use, and have a smooth finished appearance when they come from the dies, and require less attention than cast hooks and levers.

In the drawings,—

Fig. 1 shows in side elevation a jack-lever or back-lever made in accordance with the invention, with a pair of hooks connected therewith.

Fig. 2 is an edge view thereof looking from the right-hand side in Fig. 1.

Figs. 3 and 4 are edge views of the two members composing the lever of Figs. 1 and 2.

Figs. 5 and 6 are views in section in the planes indicated by dotted lines 5—5 and 6—6 in Figs. 1 and 2.

Having reference to the drawings,—

The jack-lever or back-lever 1 and hooks 2, 2, correspond in form and in mode of use with the like parts of dobbies in use at the present time.

The lever 1 is, in conformity with the invention, of the composite or built-up structure indicated in Figs. 2, 3, and 4, namely composed of two pieces of sheet metal comprising the members 11 and 12 indicated in Fig. 2 and shown separately in Figs. 3 and 4. In the process of making the lever these two members are separately stamped from sheet metal, preferably cold rolled steel, and are then permanently united, by welding. In the present instance they are assumed to be united by spot welding at the points *x*, *x*, Fig. 1, as indicated by the shaded spots. The hooks 2, 2, may be made by casting in some instances, but preferably, as one feature of the invention, they are stamped from sheet metal, each with a hole or eye at the end thereof opposite the hook 21, and in the said eye is seated with a driving fit a pin 3, the ends of which project at opposite ends of the hook for pivotal engagement with the lever 1.

In the manner just indicated, the pivotal pin is affixed securely to the hook.

For the accommodation of the butt-end of a hook at each end of the lever, the end-portions of the two members 11 and 12 are spaced apart at each end of the lever by means of an offset 121 made in one of the members by bending the end-portion away from the plane of the adjacent member into a plane parallel with that of the said adjacent member. This offset, as indicated in Figs. 2, 3 and 4, is formed at one end of one of the two members, and at the opposite end of the other of said members, so that thereby the spaces for the accommodation of the butt-ends of the two hooks are out of line with each other, and the two hooks occupying the said spaces are located and work in different vertical planes in order to enable them to be controlled from adjacent lines of pegs or other indicators on the pattern chain of the dobby, as usual in certain classes of dobbies.

At each end of the lever, alongside the offset portion 121 of one member, a lateral flange or lip 111 is formed on the other member, this flange or lip being produced by bending a projecting marginal portion of the end-portion of the latter member around toward the offset so that the edge of the lip and the inner surface of the said offset portion come together.

The flange or lip 111 serves as a spacer by means of which the proximate end-portions of the two members are held at a proper distance apart to accommodate the butt of a hook, and avoid binding on the said butt so as to interfere with free swinging movement of the hook.

One extremity of the lip 111 constitutes a stop for the hook, by means of which the hook is prevented from becoming thrown back too far from its working position.

Preferably, in forming the respective members of the lever, the offset portion of each member is formed with a slight inclination toward the plane of the body-portion of the member, to insure that when the two members are brought together the slightly inclined off-set portion of one member shall converge toward the other member and bear against the edge of the lip of the other member, instead of opening away from the other member.

In bending the lip 111 around, the corner at 112 is rounded in cross section, as shown in Fig. 6, so that thereby the tendency of the end-portion of the next adjoining lever in the dobby to catch against such portion of the lever, which catching might interfere with the proper working of the parts, is avoided.

In the operations of making the respective members 11 and 12 of a lever, holes are punched in the ends of such members at 113, 113, for the reception of the end-portions of the pivot-pins 3, 3, of the hooks. Holes 4 are punched at the middle of the respective members 11 and 12 to receive the pivotal projection from a harness-lever by means of which the lever 1 is mounted upon such harness-lever. In order to provide the lever 1 with a longer bearing upon the said pivotal projection I preferably offset as at 114, Figs. 1, 2 and 5, the metal of one of the members, as the member 11, around the hole 4. Preferably, also, in order to retard enlargement of the holes 4 of the two members, as a result of wear due to use, I place a washer-shaped ring 5, shown in Fig. 5, between the two members 11 and 12 in the recess produced by the offsetting of one of the said members.

In the process of manufacture, the washer 5 is seated in the recess in member 11; the hooks 2, 2, with pins 3, 3, applied to their butt-ends and projecting at opposite sides of the hooks, as indicated above, are placed between the end-portions of the two members 11 and 12; and the parts are brought close together, with the end-portions of the pivot-pins 3, 3, seated in the bearing-holes 113, 113, of the two members, and with the two members in contact with each other throughout their length. The parts having been thus assembled, the members 11 and 12 are fastened together, by welding, as for instance by spot welding as already described. The holes at 4 in the two members and in the washer are then reamed out.

Should it be desired to remove a hook for any purpose, as for the purpose of replacing a worn hook by another, this may be effected by driving out the pivot-pin 3, and replacement may be effected by inserting the hook into the empty space between the corresponding end-portions of members 11 and 12 and driving a pivot-pin into place. The driving fit of such pin within the eye in the butt of the hook will hold the pin in place, while the looser fit of the pivotal portions of the pin in the bearing holes made in the said end-portions of the two members 11 and 12 will enable such pivotal portions to turn in the said bearings. Or, the two end-portions of the members 11 and 12 may be sprung apart temporarily to permit disengagement of the pivot-pin from the bearings in such end-portions, and the removal of the old hook, followed by the insertion of a hook into place and engagement of the ends of its pivot-pin in the said bearings, after which the two end-portions of the members 11 and 12 may be permitted or caused to close together upon the inserted hook. To prevent the metal of the offset portion 121 of a lever-member from giving way in these operations and becoming set at the shoulder where such offset portion extends away from the plane of the body of such member, I form the said shoulder at an incline relative to the length of said member, as shown best in Fig. 1.

What is claimed as the invention is:—

1. The combination with a dobby jack-lever having a pair of bearings spaced apart to receive the butt of a hook between them, of a hook constituted by a stamping of sheet-metal formed with a hole through its butt, and a pivot pin fitting said hole with a tight driving fit, and thereby securely affixed to the hook, and with its ends projecting at opposite sides of the hook and working in said bearings.

2. A dobby-lever composed of companion members constituted by stampings of sheet-metal welded together face to face, each member having one end-portion thereof offset to accommodate a hook between it and the adjoining end-portion of the other member, and each member having the said adjoining end-portion thereof provided with a lip or flange bent transversely toward the offset portion of the other member, with the external corner along the said lip or flange rounded in cross-section, and having combined therewith hooks pivoted between the spaced-apart end-portions at the opposite ends of the lever.

In testimony whereof I affix my signature.

EUGENE C. AMSDEN.